United States Patent [19]

Fujii et al.

[11] Patent Number: 4,698,158

[45] Date of Patent: Oct. 6, 1987

[54] PROCESS FOR TREATING INDUSTRIAL WASTEWATERS BY ACTIVATED SLUDGE

[75] Inventors: Masahiro Fujii; Minoru Kamada; Shigeharu Matsubara, all of Kitakyushu, Japan

[73] Assignee: Nippon Steel Corporation, Tokyo, Japan

[21] Appl. No.: 902,069

[22] Filed: Aug. 27, 1986

Related U.S. Application Data

[63] Continuation of Ser. No. 684,970, Dec. 21, 1984, abandoned, which is a continuation of Ser. No. 492,875, May 9, 1983, abandoned.

[30] Foreign Application Priority Data

| May 13, 1982 | [JP] | Japan | 57-79132 |
| Dec. 25, 1982 | [JP] | Japan | 57-230962 |
| Dec. 25, 1982 | [JP] | Japan | 57-230963 |
| Mar. 28, 1983 | [JP] | Japan | 58-51840 |

[51] Int. Cl.$^4$ .............................................. C02F 3/12
[52] U.S. Cl. ................................. 210/610; 210/614; 210/626; 210/631
[58] Field of Search ............... 210/602, 610, 611, 614, 210/631, 919, 606, 632, 904, 626

[56] References Cited

U.S. PATENT DOCUMENTS

| 2,718,523 | 9/1955 | Thomas | 260/461.3 |
| 4,271,013 | 6/1981 | Bhattacharyya | 210/631 |
| 4,370,233 | 1/1983 | Hayes et al. | 210/614 |
| 4,415,451 | 11/1983 | Suzuki | 210/610 |

FOREIGN PATENT DOCUMENTS

| 38017 | 4/1981 | European Pat. Off. |  |
| 2440536 | 7/1975 | Fed. Rep. of Germany |  |
| 2535803 | 2/1977 | Fed. Rep. of Germany |  |
| 3013881 | 10/1981 | Fed. Rep. of Germany | 210/614 |
| 54-22955 | 2/1979 | Japan | 210/614 |
| 57-140698 | 8/1982 | Japan | 210/617 |
| 1489592 | 10/1977 | United Kingdom |  |

OTHER PUBLICATIONS

Arthur R. M., "New Concepts and Practices in Activated Sludge Process Control", Arthur Technology, Inc. in co-publ. with Ann Arbor Science, pp. 64–66 (1982).

*Primary Examiner*—Benoit Castel
*Attorney, Agent, or Firm*—Wenderoth, Lind & Ponack

[57] ABSTRACT

A process for activated sludge treatment of industrial wastewaters which uses, in the aeration tank of an activated sludge treatment plant, at least one member of the group consisting of phytic acid, phytate salts and materials containing the same, as well as at least one other phosphorus-containing compound.

12 Claims, 4 Drawing Figures

PROCESS FOR TREATING INDUSTRIAL WASTEWATERS BY ACTIVATED SLUDGE

This application is a continuation of now abandoned application Ser. No. 684,970 filed Dec. 21, 1984, which is a continuation of now abandoned application Ser. No. 492,875 filed May 9, 1983.

FIELD OF THE INVENTION

The present invention relates to a process for treating industrial wastewaters, especially those containing organic components, by activated sludge. More particularly, the present invention relates to an activated sludge process for treating industrial wastewaters containing organic components and materials that inhibit the activity of bacteria (activated sludge), characterized by the ability to prevent a decrease in the efficiency of biodegradation (bioresolvability), and if these abnormal phenomena occur, to restore normal biodegradation in a very short period of time. The present invention further relates to an activated sludge process that is also characterized in that the concentration of the phosphorus-containing compound present in the effluent from the activated sludge treatment plant is not more than 1 mg/1,000 ml as phosphorus.

BACKGROUND OF THE INVENTION

The activated sludge process is currently used to treat industrial wastewaters containing pollutants such as organic components, for example, wastewaters discharged from iron works, steel works, gas works, and chemical plants petroleum wastewaters, pulp mill wastewaters, wastewaters from agricultural or marine product processing plants, as well as city sewage. Since different wastewaters have different compositions and cannot be easily treated by the activated sludge process under the same conditions, activated sludge treatments of these wastewaters are operated on the basis of empirical data. In particular, wastewaters discharged from coke ovens and petroleum refineries contain materials that inhibit the activity of bacteria, so if they are treated by the conventional activated sludge process, the efficiency of the influent biodegradation drops and the quality of the effluent is decreased. In most cases, the cause of this decrease in the efficiency of biodegradation is unknown and there is no definite means for restoring the normal biodegradation other than by letting the bacteria (activated sludge) revive themselves, which usually takes as long as at least one to six months.

A version of the activated sludge process that controls the conditions for treatment on the basis of the activity of the sludge, rather than empirical data is described in Japanese Patent Publication No. 27096/81 According to this process, the activity of the activated sludge is evaluated by measuring the oxidation-reduction potential (ORP) of the sludge (including return sludge) in the aeration tank. In order to maintain the sludge in an active state, various parameters (especially, the dilution rate of the sludge, aeration volume and the amount of return sludge) are controlled so that the value of ORP is held within the proper range. However, even this method involves difficulty in preventing a decrease in the biodegradation efficiency from occurring in the treatment of industrial wastewaters containing organic conponents and materials that inhibit the activity of bacteria. Once the biodegradation of the organic conponents is inhibited, maintaining the ORP within the proper range by controlling the aeration volume and other parameters is no longer effective in restoring the normal level of degradation within a short time.

In the activated sludge treatment of the industrial wastewaters listed above, phosphorus-containing compounds, especially inorganic phosphoric acid compounds, such as phosphoric acid and ammonium phosphate are commonly used as nutrients for bacteria. However because of the low availability of the inorganic phosphoric acid compounds to bacteria, the effluent obtained by process of the activated sludge treatment of industrial wastewaters contains unused phosphorus-containing compounds in a considerable amount.

As described above, when industrial wastewaters, especially those containing organic components and materials that inhibit the activity of bacteria, are treated by the conventional activated sludge process, a drop in the efficiency of biodegradation often occurs, and once it occurs, a prolonged period is necessary for restoring the normal biodegradation. Furthermore, the use of a large quantity of phosphorus-containing compounds, for example, inorganic phosphoric acid compounds, results in the production of effluent liquors containing a high proportion of these compounds. Therefore, a new process of activated sludge treatment free from these problems of the conventional method has been needed.

SUMMARY OF THE INVENTION

One object of the present invention is to provide a method of preventing a decrease in the efficiency of biodegradation in the activated sludge treatment of industrial wastewaters, especially those containing organic components and materials that inhibit the activity of bacteria.

Another object of the present invention is to provide a method of rapidly restoring the normal biodegradation when its efficiency drops during the activated sludge treatment of industrial wastewaters, especially those containing organic components and materials that inhibit the activity of bacteria.

A further object of the present invention is to provide a method which is also capable of greatly reducing the concentration of phosphorus-containing compounds in the effluent liquors discharged from the activated sludge treatment process of the industrial wastewaters described above.

Still another object of the present invention is to provide an operating system best suited to the activated sludge treatment of the industrial wastewaters described above.

These objects of the present invention are achieved in the following manner.

Thus, the invention provides a process of activated sludge treatment of industrial wastewaters, especially those containing organic components and materials that inhibit the activity of bacteria, such as coke-oven and petroleum industry effluent liquors, which uses in the aeration tank of an activated sludge treatment plant at least one member of the group consisting of phytic acid, phytate salts and materials containing the same, as well as at least one other phosphorus-containing compound throughout the treatment or as long as an abnomal phenomena (an inhibited biodegradation) is observed. The definition of "other phosphorus-containing compound" includes inorganic compounds such as inorganic phosphoric acid compounds (e.g. phosphoric acid and ammonium phosphate).

The waste-waters can be treated by controlling the oxidation-reduction potential of the activated sludge in the aeration tank.

The oxidation-reduction potential in the aeration tank of the activated sludge process that has been reduced by the addition of phytic acid, phytate salts or materials containing the same can be increased to a level which is lower than the proper value by no more than 50 mV by means of controlling the aeration volume.

The waste-waters can be treated by controlling the oxidation-reduction potential of the activated sludge in the sludge settling tank, as well as the aeration tank.

A controlled amount of the phosphorus-containing compound can be supplied to the aeration tank so that the concentration of the phosphorus-containing compound present in the activated sludge effluent is not more than 1 mg/1,000 ml as phosphorus. The amount of the phosphorus-containing compound supplied may be controlled by adding it to the wastewaters at any point in the line leading to the aeration tank.

The material containing phytic acid can be at least one member of the group consisting of rice bran, wheat bran, corn husk, and the residue of the processing vegetable oils such as sesame oil and soybean oil.

DETAILED DESCRIPTION OF THE INVENTION

Figure 1:
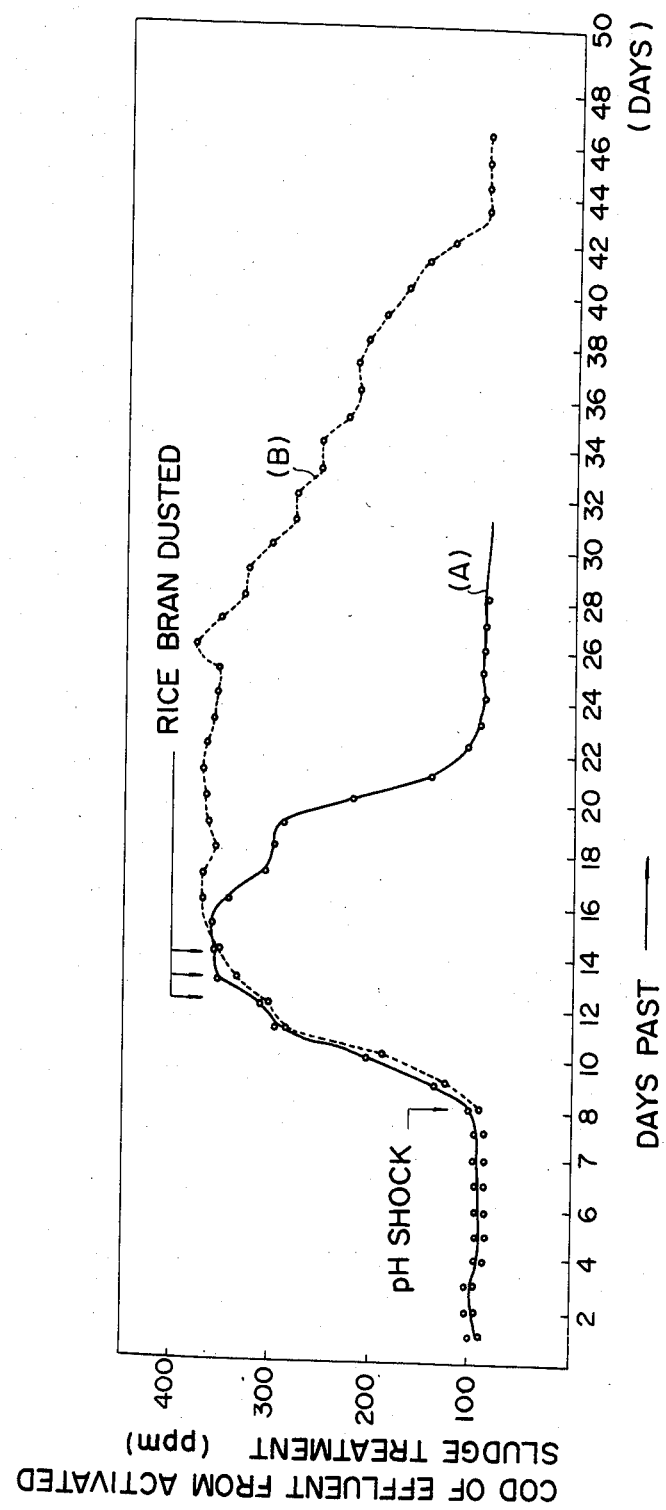
FIG. 1 shows the effectiveness of dusting rice bran in an aeration tank for quick recovery of the COD (chemical oxygen demand) of the activated sludge effluent of a coking plant waste liquor after the biodegradation (bioresolvability) of activated sludge is impeded by pH shock.

The process of the present invention is hereunder described in detail by reference to the activated sludge treatment of coke-plant waste liquor as a typical example of the wastewaters containing organic components and materials that inhibit the ability of bacteria. The coke-plant waste liquor is a by-product of coal carbonization that is produced in an amount of about 10 to 15% of the coal feed. It contains organic compounds such as phenol, cresol and xylenol, as well as inorganic compounds such as ammoniates, cyanides, thiocyanates, thiosulfates and sulfides. Furthermore, the coke-plant waste liquor has a COD of as high as 5,000 to 10,000 ppm and is dark brown, so it cannot be directly discharged to a water basin for public use.

This coke-plant waste liquor is conventionally treated by the activated sludge process which consists of removing part of the ammoniates by distillation or any conventional technique, diluting the liquor with twice to six times its own volume of seawater or fresh water, and adding, as a bacterial nutrient, about 1 part by weight (as phosphorus) of an inorganic phosphorus containing compound per 100 parts by weight of the biological oxygen demand (BOD) of the waste liquor. The activated sludge treatment of the coke-plant waste liquor is an important process for degrading and removing the greater part of the COD components such as phenolic compounds and thiocyanates, and presently, the treatment method and operating condition used in this process are identical to those employed in the activated sludge treatment of city sewage. However, the coke-plant waste liquor is more complex in composition than city sewage and contains cyanates, sulfides and other components that inhibit the activity of the activated sludge. Therefore, the plant design, process control and operating techniques used in the activated sludge treatment of city sewage cannot be unlimitedly applied to the treatment of coke-plant waste liquor.

In the conventional treatment of the coke-plant waste liquor by activated sludge, a drop in the efficiency of biodegradation by the sludge often occurs for an unaccountable reason, and once it occurs, the normal biodegradation must be restored on a trial-and-error basis, which usually takes as long as one to six months before the desired result is obtained.

One important problem with the inhibited biodegradation is that in most cases, the biodegradability of thiocyanates is reduced and the quality of the effluent is impaired. Thiocyanates in the waste liquor cannot be easily removed even by a technique such as coagulation and sedimentation by iron salts or activated carbon treatment, and the technique that has to date been found most economical and effective is the activated sludge treatment. So, if a thiocyanate compound cannot be broken by activated sludge, it will simply pass through a catch-all apparatus using iron salt coagulants or activated carbon. The growth rates of the bacteria that degrade thiocyanates (thiocyanate utilizing bacteria) are much slower than those degrading phenols, and according to an experiment conducted by the present inventors, when the function of the thiocyanate utilizing bacteria is impaired by toxic or pH shocks, it takes at least 20 to 60 days for their function to be restored to its normal level after removing the shock. This means that the waste liquor maintains high COD and thiocyanate levels for as long as 20 to 60 days.

Another important problem is that the COD of the coke-plant waste liquor accounts for the highest proportion (about 50 to 70%) of the COD originating from steel works, so if the inhibition of biodegradation by activated sludge occurs and continues for a prolonged time, it becomes highly likely that the regulations on water pollution will be contravened.

The method of Japanese Patent Publication No. 27096/81 for controlling the activity of activated sludge by using ORP as an index is currently used for the treatment of the coke-plant waste liquor, but it is not very effective in preventing the drop in the efficiency of biodegradation and restoring the normal biodegradation. Therefore, the present invention has been accomplished in order to provide a technique for preventing inhibited biodegradation, as well as a technique for recovering normal levels of biodegradation much faster than the method of Japanese Patent Publication No. 27096/81.

The conventional technique, as well as the method of the present invention, for recovery of normal biodegradation conditions are hereunder described. Components of the coke-plant waste liquor that are detrimental to the function of activated sludge, or abnormal pH levels can inhibit the biodegradation by the activated sludge because they result in shocks which cause the death of a significant proportion of the bacteria (those utilizing BOD components in the waste liquor) that make up the activated sludge. Therefore, the first step towards recovering normal biodegradation is to increase the number of growing bacteria to the level necessary for achieving normal biodegradation. Most commonly, this is accomplished by removing the cause of the inhibited biodegradation and adjusting the pH, temperature and DO (dissolved oxygen) concentration of the activated sludge process to within the proper ranges.

However, activated sludge is an aggregate of various kinds of bacterial which often have greatly varying properties. For example, as already mentioned, thiocyanate-utilizing bacteria grow at a very slow rate which is only about one fortieth of the growth rate of bacteria that degrade phenolic compounds. Therefore, to recover the normal efficiency of the activated sludge treatment of coke-plant waste liquor in a short period, the proliferation of slowly growing bacteria such as thiocyanate-utilizing bacteria must be accelerated. Conventionally, the parameters for the activated sludge treatment such as temperature, pH and DO concentration are kept within the proper ranges to induce the spontaneous growth of bacteria, but as already mentioned, it usually takes several months for the bacteria to grow themselves to the desired levels.

The present inventors made various studies to develop a method of recovering the normal efficiency of the activated sludge treatment of coke-plant waste liquor by accelerating the growth of thiocyanate-utilizing bacteria. Most bacteria are known to grow at an accelerated rate in the presence of a trace amount of vitamin or enzyme. Noting this point, the present inventors added vitamins or enzymes to the aeration tank of a system for treating coke-plant waste liquors by the activated sludge process, and found that the growth rate of thiocyanate bacteria in the presence of vitamins or enzymes was about twice to five times as high as the rate achieved in their absence. These results suggest the possibility of quickly recovering the normal efficiency of the activated sludge treatment by adding vitamins or enzymes to activated sludge of inhibited biodegradation. However, for practical applications, this method requires a large amount of vitamins or enzymes and is not cost effective. Therefore, the present inventors made a search for substitutes for vitamin or enzyme that could be mass produced, and found that phytic acid and water-soluble phytate salts met this requirement.

Phytic acid has the molecular formula $C_6H_6[OPO(OH)_2]_6$. Containing a large amount of phosphorus in the molecule, phytic acid and phytate salts are capable of accelerating the bacterial growth. The present inventors also found that by adding phytic acid or phytate salts to the coke-plant waste liquor being treated with activated sludge, the function of the sludge that had been damaged by deleterious components in the waste liquor such as cyanides and sulfides could be readily restored. If phytate salts are to be used, water-soluble salts are more effective than insoluble salts, and the best results are obtained with sodium phytate, potassium phytate and ammonium phytate.

If the sole object of adding phytic acid or salts thereof is to increase the activity of the activated sludge, they may be added daily in an amount of about 1 g to 10 g, preferably about 1 to 5 g, per cubic meter of the aeration tank. If they are added to restore the normal efficiency of the activated sludge treatment, the amount of their addition varies with the severity of the deterioration of the treatment. If it is slight, 20 to 30 g of phytic acid or salts thereof may be added daily per cubic meter of the aeration tank, and if the deterioration is serious, 50 to 100 g will be necessary to recover the normal efficiency of the treatment in a shorter period.

Phytic acid naturally occurs in a high proportion in cereals or vegetable seeds. The present inventors have found that phytic acid could be replaced by the powders of cereals or vegetable seeds having a high phytic acid content in order to recover quickly the normal efficiency of the activated sludge treatment of coke-plant waste liquors, to activate the sludge, and to accelerate the growth of bacteria in the sludge. For economical purposes, rice bran, wheat bran, corn husk, and the oil cakes left after extraction of vegetable oils such as sesame oil and soybean oil are best suited. They are separated from the valuable portions of cereals or vegetable seeds such as polished rice, wheat flour, corn flour, soybean meal and vegetable oils, and are used as fodders or fertilizers. They contain phytic acid, phytate salts, as well as vitamins and enzymes; when they are dusted in the aeration tank of a system for treating coke-plant waste liquors by the activated sludge process, the synergistic effects of phytic acid or phytate salts and vitamins or enzymes prove more effective in recovering normal biodegradation and activating the sludge than when phytic acid or phytate salts are used independently. Among the phytic acid containing materials, rice bran is the most effective. For the purpose of restoring the normal efficiency of the treatment, these phytic acid containing materials may be added to the aeration tank daily in an amount of about 100 to 500 g per cubic meter of the tank. If the sole purpose is to increase the activity of the sludge, they may be added daily in an amount of 10 to 50 g per cubic meter of the aeration tank.

The method of controlling the ORP of the activated sludge in the aeration tank according to the present invention is hereunder described. As reported in Japanese Patent Publication No. 27096/81, the use of the ORP as an index for the process control of the activated sludge treatment is known and has proved effective in the treatment of city sewage. However, as mentioned above, this method is not necessarily satisfactory in the activated sludge treatment of industrial wastewaters containing organic components and materials that inhibit the activity of bacteria.

According to the process of the present invention, if the efficiency of biodegradation by the activated sludge is reduced, not only phytic acid, phytate salts or materials containing the same, but also conventionally used phosphorus-containing compounds (such as inorganic phosphoric acid compounds), may be incorporated in the aeration tank to greatly increase the growth rate of bacteria (i.e. the activity of the sludge). The resulting increase in the oxygen demand of the activated sludge will cause a drop in the ORP if the previous level of aeration volume is maintained. For example, if rice bran as a material containing phytic acid is dusted in the aeration tank together with an inorganic phosphoric acid compound, the formation of bubbles in the aeration tank stops immediately and at the same time, the ORP of the activated sludge is reduced. The amount of reduction in the ORP depends on the amount of rice bran added, and it is usually in the range of from about 10 to 200 mv. The decreasing ORP is indicative of the degradation of the rice bran by the activated sludge. However, in order to further promote the degradation of the rice bran by the activated sludge and to recover normal levels of biodegradation, the marked drop in the ORP must be inhibited. This can be effectively accomplished by increasing the aeration volume and restoring the ORP to the proper level. This is sometimes difficult to realize if a large amount of rice bran has been added. The present inventors confirmed by experiments that when the ORP of the activated sludge was increased to a level lower than the proper value by no more than 50 mV by means of increasing the aeration volume, in almost all cases did the degradation of rice bran proceed smoothly, and restorations of normal levels of biodegradation were promoted. In this connection, it should be noted that if the ORP remains low, the degradation of thiocyanates does not proceed efficiently and the quality of the effluent may deteriorate.

Therefore, in the process of the present invention, the conventional use of the ORP as an index for the control of the activity of the activated sludge is combined with the use of a bacterial nutrient consisting of phytic acid, phytate salts or materials containing the same. By so doing, the present invention has for the first time enabled rapid recovery of normal levels of biodegradation in the activated sludge treatment of industrial wastewaters.

The foregoing description concerns the method of the present invention for quick recovery of normal biodegradation by incorporating not only phytic acid, phytate salts or materials containing the same, but also other phosphorus-containing compounds such as inorganic phosphoric acid compounds, as soon as there occurs a drop in the efficiency of biodegradation in the activated sludge treatment of industrial wastewaters. The subsequent studies by the present inventors have shown that the drop in the efficiency of biodegradation can be prevented by incorporating more than the minimum amount of phytic acid, water-soluble phytate salts or materials containing the same, such as rice bran, in combination with conventional bacterial nutrients consisting of phosphorus-containing compounds such as inorganic phosphoric acid compounds throughout the process of the activated sludge treatment.

The method of preventing the drop in the efficiency of biodegradation, as well as the method of controlling the amount of phosphorus-containing compounds carried into the effluent are described hereunder.

As described above, the conventional method of treating coke-plant waste liquors by activated sludge consists of removing part of the ammoniates by a known technique, diluting the waste liquor with twice to six times its own volume of seawater or fresh water, and adding a bacterial nutrient consisting of about one part by weight (as phosphorus) of a conventional phosphorus-containing compound such as an inorganic phosphoric acid compound per 100 parts by weight of the BOD of the waste liquor.

When the present inventors treated coke-plant waste liquors by activated sludge using phosphoric acid in different amounts within the conventional range, only 20 to 60% of the phosphoric acid added was taken up by the activated sludge (bacteria) and the remainder was uselessly released into the effluent.

In order to reduce the amount of a phosphorus-containing compound, say, inorganic phosphoric acid compound in the effluent, the present inventors added smaller amounts of an inorganic phosphoric acid compound to the aeration tank of an activated sludge treatment plant. The intended object of reducing the inorganic phosphoric acid compound in the effluent was achieved, but on the other hand, the efficiency of the treatment was reduced because of bulking and the poor degradation of COD components such as thiocyanates. It was therefore very difficult to reduce the concentration of phosphorus-containing compounds in the effluent to a level less than 1 mg/1,000 ml (as phosphorus) by the conventional method of activated sludge process without sacrificing the efficiency of the treatment.

The present inventors therefore reviewed the applicability of organic phosphorus-containing compounds since organic phosphoric acid compounds such as ADP (adenosine di-phosphate) and ATP (adenosine tri-phosphate) were closely connected with the metabolism of the activated sludge. As a result, the inventors found that when phytic acid, or a phytate salt (also an effective bacterial nutrient; a water-soluble phytate salt such as sodium salt being preferred), which is an organic phosphate ester and an effective bacterial nutrient, was added to the aeration tank of an activated sludge treatment plant, the effective availability of phosphorus to the activated sludge (bacteria) was nearly 100% and almost no phosphorus-containing compound was carried into the effluent. It was also found that when the organic phosphate ester was combined with an inorganic phosphoric acid compound, the effective availability of the inorganic phosphoric acid compound to the activated sludge was increased to about 78–83%. In short, the combination of the organic phosphate ester and the conventionally used phosphorus-containing compound such as an inorganic phosphoric acid compound has the advantage of increasing the availability of not only the organic phosphate ester but also the conventional phosphorus-containing compound to the activated sludge. Because of this advantage, the amount of the conventionally used phosphorus-containing compound (e.g. inorganic phosphoric acid compound) to be incorporated in the aeration tank can be greatly reduced while achieving a significant decrease in the amount of the phosphorus-containing compound carried away into the effluent.

Based on these observations, the present inventors searched for the conditions necessary to prevent the drop in the efficiency of biodegradation while holding the concentration of phosphorus-containing compounds in the effluent at less than 1 mg/1,000 ml (as phosphorus). As a result, the inventors found that for the activated sludge treatment of coking-plant waste liquors at a daily COD volume loading of 1 to 3 kg/m$^3$, the intended object could be achieved by continuously adding 1 to 5 g of phytic acid or phytate salts and 3 to 4 g (as phosphorus) of a conventionally used phosphorus-containing compound such as inorganic phosphoric acid compound, daily, per cubic meter of the aeration tank.

Phytic acid and phytate salts as single compounds are quite expensive as compared with the conventionally used phosphorus-containing compound (e.g. inorganic phosphoric acid compound), so the inventors repeated the same experiment by replacing them with materials containing phytic acid or phytate salts such as rice bran or wheat bran that were separated from rice or wheat grains by sifting, or oil cakes left after the production of oils from vegetable seeds such as sesame seeds and soybeans, and the results were as good as those obtained by using phytic acid or phytate salts themselves. The above mentioned cereal grains and vegetable seeds contain phytic acid, and rice bran has a particularly high phytic acid content (Ca, 4–7%). Therefore, using cheaper rice bran, wheat bran or oil cakes in place of phytic acid and phytate salts is preferred for economical reasons, and the optimum amount of their addition is in the range of from about 10 to 50 g daily per cubic meter of the aeration tank. The amount of phytic acid, phytate salts or materials containing the same that must be added to the aeration tank for preventing the drop in the efficiency of biodegradation in the activated sludge treatment or for reducing the concentration of phosphorus carried into the effluent liquor is only one fifth to one tenth of the amount required for quick recovery of normal biodegradation. When phytic acid containing materials such as rice bran, wheat bran and oil cakes are used, phytic acid supplied from these materials may be added in an amount less than in the case where phytic acid or phytate salts are added as single compounds, to achieve the intended objects of the present invention. As already mentioned, this is because the materials listed above contain not only phytic acid but also vitamins and enzymes which are effective in increasing the growth rate of bacteria in the activated sludge and the activity of that sludge.

The method of reducing the concentration of phosphorus-containing compounds in the effluent from the activated sludge plant to a level lower than 1 mg/1,000 ml by means of controlling the addition of a phosphorus-containing compound, say, an inorganic phosphoric acid compound is hereunder described. If it is desired to prevent the drop in the efficiency of biodegradation in the activated sludge treatment of coke-plant waste liquors, a predetermined amount of at least one member of the group consisting of phytic acid, phytate salts and materials containing the same is added daily to the aeration tank of the treatment plant, preferably in one to three portions. Then, a conventional phosphorus-containing compound, say, an inorganic phosphoric acid compound, is added continuously to the raw wastewater (influent liquor) or the aeration tank in such an amount that the concentration of the phosphorus-containing compounds in the activated sludge effluent is not more than 1 mg/1,000 ml (as phosphorus). More specifically, if the concentration of the phosphorus-containing compound exceeds 0.5 mg/1,000 ml (as phosphorus), the addition of the conventional phosphorus-containing compound is gradually decreased until the concentration of the phosphorus-containing compounds in the effluent becomes less than 1 mg/1,000 ml, preferably between 0.2 and 0.5 mg/1,000 ml (as phosphorus). If the concentration of the phosphorus-containing compound in the effluent is less than 0.2 mg/1,000 ml (as phosphorus), it becomes highly likely that the efficiency of biodegradation is reduced, so in order to avoid this undesired phenomenon, an increased amount of a conventional phosphorus-containing compound, say, an inorganic phosphoric acid compound, is added until the concentration of the phosphorus-containing compounds in the effluent becomes stable at below 1 mg/1,000 ml, preferably between 0.2 and 0.5 mg/1,000 ml (as phosphorus).

The oxidation-reduction potential (ORP) in the settling tank of an activated sludge treatment plant has the following relationship with the concentration of phosphorus-containing compounds in the effluent. In an aerobic activated sludge treatment, the aeration tank is held under aerobic conditions whereas the settling tank is under anaerobic conditions. Aerobic activated sludge (bacteria) are able to take up phosphorus-containing compounds into their cells under aerobic conditions, but under anaerobic conditions, they have a tendency to release such compounds from their cells. Therefore, the activated sludge in the aeration tank has a higher content of phosphorus-containing compounds than the sludge in the settling tank. In addition, the longer the ratention time of the activated sludge in the settling tank, the lower the content of phosphorus-containing compounds in the activated sludge in that tank, with a corresponding increase in the concentration of the phosphorus-containing compounds in the effluent.

As a logical consequence of these observations, the release of the phosphorus-containing compounds from the activated sludge can be inhibited by preventing the settling tank from becoming anaerobic. This effect, combined with the already described increase in the effective availability of phosphorus in phytic acid, phytate salts or materials containing the same, can cause a reduction in the concentration of the phosphorus-containing compounds in the effluent. The conditions under which the settling tank is placed can be best controlled by using the ORP as an index.

According to the experiments conducted by the present inventors, the release of phosphorus-containing compounds from the activated sludge slows down when the ORP is higher than about +100 mV, preferably higher than +200 mV/vs hydrogen electrode). This finding led the inventors to assume that by holding the ORP in the settling tank at a level higher than about +100 mV, preferably higher than +200 mV the release of phosphorus from the sludge, and hence the concentration of the phosphorus-containing compounds in the effluent, could be reduced. In most cases of aerobic activated sludge treatment, the ORP in the aeration tank is higher than that in the settling tank by a value between about +100 and +200 mV, and the higher the ORP in the aeration tank, that is, the more aerobic (oxidative) the environment of the aeration tank is, the higher the ORP in the settling tank. Therefore, by maintaining the ORP of the aeration tank of a system for the activated sludge treatment of coke-plant waste liquors at a level between +400 and +480 mV, the ORP in the settling tank can be held at a level that inhibits the release of phosphorus from the sludge. In short, coke-plant waste liquors can be treated by the activated sludge process while the release of phosphorus-containing compounds from the activated sludge is inhibited by maintaining the ORP in the aeration tank at a level between +400 and +480 mV, and by maintaining the ORP in the settling tank higher than +100 mV, preferably higher than +200 mV.

In addition to the ORP control described above, the present invention uses phytic acid, phytate salts, preferably water-soluble phytate salts, or materials containing the same (these three types of compounds are easily available to the activated sludge as nutrients) in combination with a conventional phosphorus-containing compound such as an inorganic phosphoric acid compound, and at the same time, the conventional phosphorus-containing compound is added in a properly controlled amount. By so doing, the coke-plant waste liquor can be treated by the activated sludge process efficiently while maintaining the concentration of the phosphorus-containing compounds in the effluent at a level lower than 1 mg/1,000 ml (as phosphorus), with the attendant advantage that the use of the conventional phosphorus-containing compound is greatly reduced.

In the foregoing, the activated sludge treatment of coke-plant waste liquors according to the present invention has been described with particular reference to the prevention of a drop in the efficiency of biodegradation in the treatment, making a quick recovery from normal biodegradation, and the inhibition of the release of phosphorus-containing compounds into the effluent. It should be understood that the process of the present invention can be applied with equally good results to other industrial wastewaters containing organic components and substances such as cyanides and sulfides that are detrimental to the function of bacteria. Such wastewaters include pulp mill wastewaters, coal liquefying plant wastewaters and petroleum refinery wastewaters.

The present invention is hereunder described in greater detail by reference to working examples to which the scope of the invention is by no means limited.

EXAMPLE 1

Figure 2:
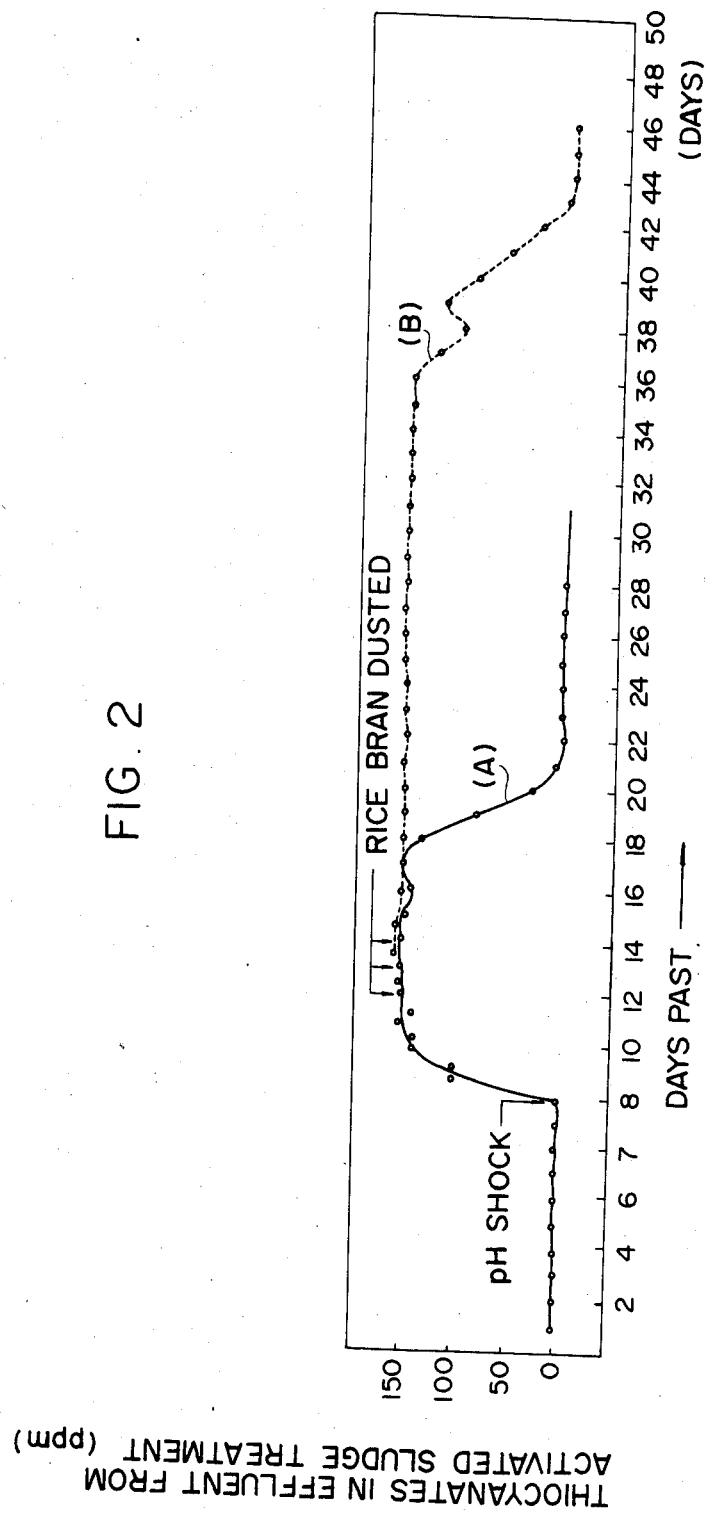
FIG. 2 shows that dusting rice bran in the aeration tank is also effective in restoring the normal biodegradation of thiocyanates by the activated sludge.

Coke-plant waste liquors were treated with two equal sized experimental activated sludge treatment apparatuses of the same capabilities under the conditions shown in Table 1. On the 8th day, in order to reduce the efficiency of biodegradation, the pH in the aeration tank of each apparatus was decreased from 7.5 to 4.5, which level was maintained for 12 hours. Following this pH shock, the oxygen consumption rate of the activated sludge was reduced to about 5 to 10% of the normal level. As shown in FIG. 1, the COD of the activated sludge effluent increased suddenly, and as illustrated in FIG. 2, thiocyanates (—SCN) became almost undegradable, indicating complete inhibition of the biodegradation by the activated sludge. In FIGS. 1 and 2, curve A shows the profile of activated sludge treatment when 300 g of rice bran was dusted per cubic meter of the aeration tank on each of the 12th, 13th and 14th days to maintain the ORP in the aeration tank between +370 and +420 mV (vs hydrogen electrode) and the pH at 7.0±0.2. Curve B indicates the profile of activated sludge treatment wherein no rice bran was added and the pH and ORP in the aeration tank were held at 7.0±0.2 and +420±10 mV, respectively. Upon addition of rice bran, the ORP in the aeration tank which was initially set at +420 mV dropped to a level between 270 and 170 mV, but by increasing the aeration volume, the ORP value could be held at between +370 and +420 mV throughout the subsequent treatment.

As a result, it took only about 9 days for the waste liquor to return to the initial levels of COD and concentration of thiocyanates after the addition of rice bran (see curve A), whereas as many as about 35 days was necessary in the absence of rice bran (see curve B). These results demonstrate that the addition of rice bran to the aeration tank and maintaining the ORP value within the specified range was very effective in restoring normal levels of biodegradation in the activated sludge treatment of coke-plant waste liquors.

Figure 3:
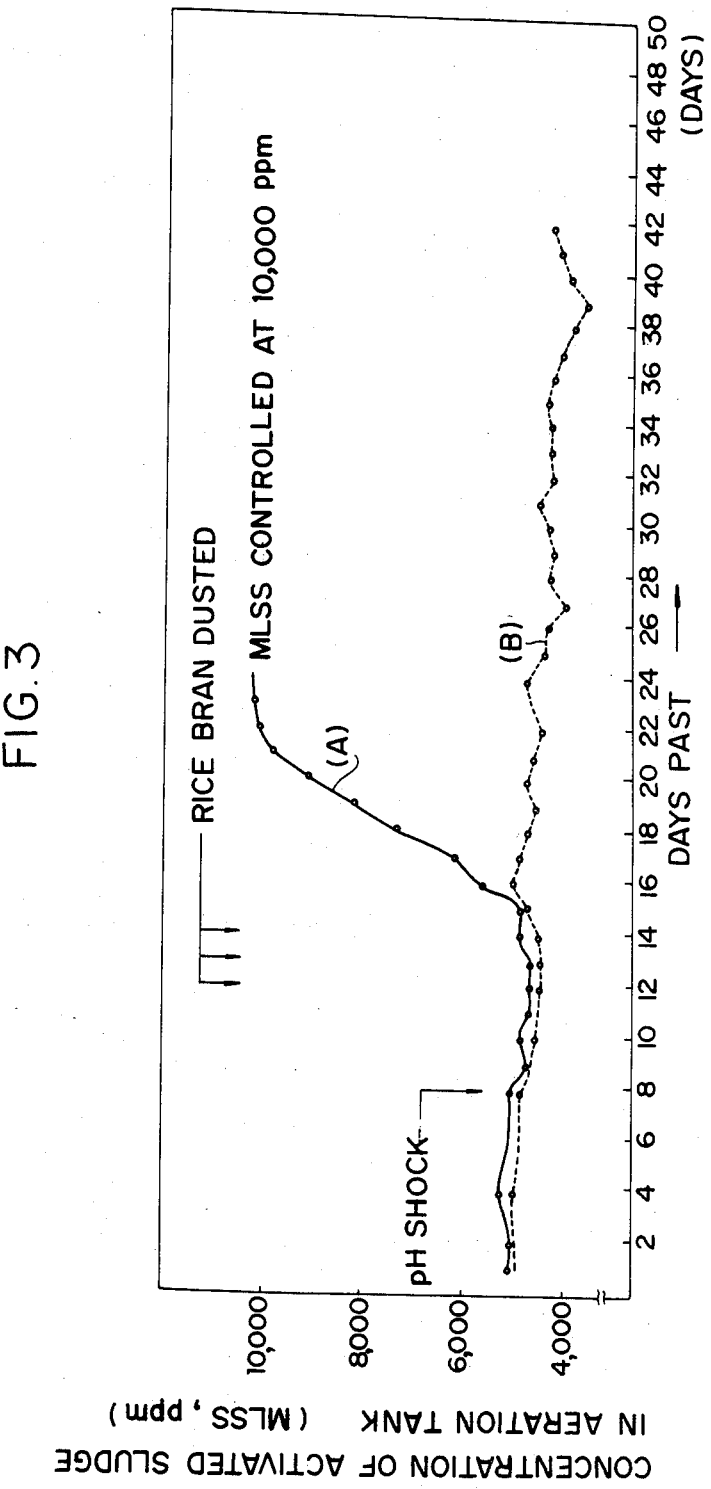
FIG. 3 shows the effectiveness of dusting rice bran in the aeration tank for accelerating the growth characteristics of bacteria in the activated sludge.
Figure 4:
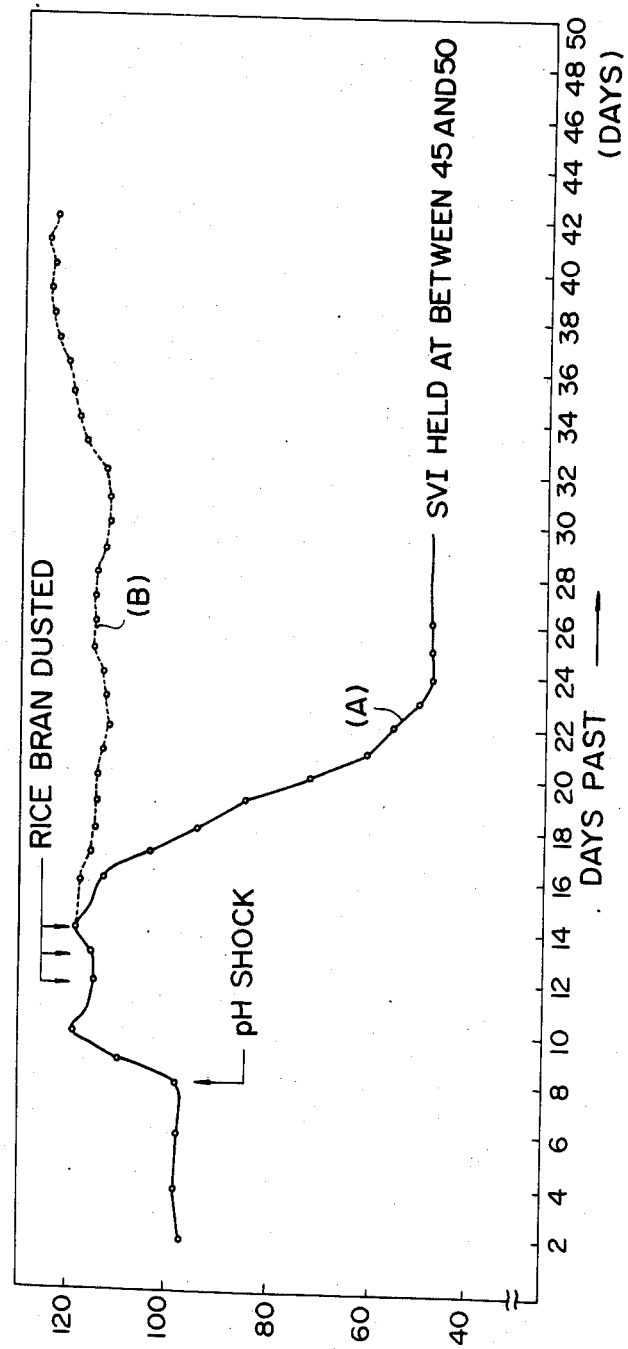
FIG. 4 shows that by dusting rice bran, the sludge volume index (SVI) as a parameter of the settleability of activated sludge is reduced and the activated sludge becomes readily settleable.

Another advantage of dusting rice bran in the aeration tank is apparent from FIG. 3 which shows the timedependant change in the concentration of activated sludge (MLSS) in the aeration tank, and from FIG. 4 showing the settleability (SVI) of that sludge. As curve A indicates, upon dusting rice bran according to the present invention, the MLSS which was initially about 5,000 ppm increased to about 10,000 ppm in about 7 days, and the SVI (a measure for sludge settleability) which increased to between about 110 and 120 following the pH shock dropped to about 50 about 10 days after the dusting of rice bran. This indicates great improvement in the settleability of the activated sludge.

When no rice bran was dusted (as indicated by curve B), the recovery from the abnormal biodegradation due to the pH shock was not accompanied by an increase in MLSS or a decrease in SVT.

It was therefore clear that dusting rice bran was very effective in not only reducing the period necessary for recovering normal levels of biodegradation but also in improving the growth rate and settleability of the activated sludge.

As described above, the process of the present invention was able to quickly recover normal biodegradation in the activated sludge treatment of coke-plant waste liquors by means of a simple method consisting of adding rice bran to the aeration tank and maintaining the ORP of the sludge in that tank within the proper range.

TABLE 1

Parameters of activated sludge treatment

| Influent composition | |
|---|---|
| Coke-plant waste liquor | 25% |
| Seawater | 50% |
| Fresh water | 25% |
| COD | 1,800–2,000 ppm |
| Phenols | 450–550 ppm |
| Thiocyanates | 140–160 ppm (as SCN) |
| pH | 7.5–8.0 |
| Operating conditions | |
| COD loading | 1.5 kg/m$^3$.day |
| MLSS | ca. 5,000 ppm (SVI: 110) |
| pH in aeration tank | 7.0 ± 0.2 |
| ORP in aeration tank | +200 mV |
| Inorganic phosphoric acid compound | added to the influent, 18-20 ppm (as P). |

EXAMPLE 2

Coke-plant waste liquors were treated by two equal sized experimental activated sludge treatment apparatuses under the same conditions as used in Example 1. To cause a drop in the efficiency of biodegradation, 50 ppm (as CN') of a cyanide was added to the aeration tank of each apparatus. As a result, the concentrations of the pollutants in the effluent increased as follows: COD from 100–150 mg/1,000 ml to 200–500 mg/1,000 ml; thiocyanates from less than 1 mg/1,000 ml to 130–150 mg/1,000 ml; phenol from less than 0.1 mg/1,000 ml to 1–5 mg/1,000 ml; suspended solids from 30–50 mg/1,000 ml to 100–500 mg/1,000 ml. In addition to this deterioration in the quality of the effluent, the oxygen consumption rate of the activated sludge which was initially at 100–150 mg O$_2$/MLSS.hr dropped to 10–30 mg O$_2$/MLSS.hr upon addition of the cyanide. The ORP in the aeration tank dropped from 420–470 mV to 120–170 mV.

After causing such deterioration of the treatment, 20 to 50 g of phytic acid (instead of rice bran) was added to the aeration tank daily per cubic meter of the tank. In 2 or 3 days, the quality of the effluent liquor was improved: the COD dropped to 200–250 mg/1,000 ml; the thiocyanate content to 50–80 mg/1,000 ml; the phenol content to 0.5–1 mg/1,000 ml; and the suspended solids content to 80–100 mg/1,000 ml. The addition of phytic acid was continued, and 15 to 20 days after the first addition, the quality of the effluent became almost equal to the initial level.

When 2 to 3 g/m³ of phytic acid was daily added to the aeration tank for about 6 months, the quality of the effluent remained very good (COD=60–70 mg/1,000 ml, thiocyanate=less than 0.5 mg/1,000 ml, phenol=0.05 mg/1,000 ml, suspended solids=less than 50 mg/1,000 ml), and no drop in the efficiency of biodegradation occurred at any time.

The oxygen consumption rate of the activated sludge returned to 100–150 mg $O_2$/MLSS.g.hr upon adding phytic acid for 15 to 20 consecutive days. After continuing the addition of phytic acid for 30 to 50 days, the oxygen consumption rate increased to 600–800 mg $O_2$/MLSS.g.hr, indicating that the sludge became very active following the continuous addition of phytic acid.

The growth rate of the activated sludge, which would be about 50–70 mg.MLSS/MLSS.g.day under normal conditions, became almost zero upon addition of the cyanide, but when phytic acid was added for 30 to 50 consecutive days, it increased to about 100–140 mg.MLSS/MLSS.g.day, indicating the great ability of phytic acid to increase the bacterial growth rate.

Similar results were obtained when phytic acid was replaced by water-soluble phytate salts, such as sodium phytate.

Conventionally, abnormally low efficiency of biodegradation in the activated sludge treatment due to the presence of toxic substances has been remedied by removing the deleterious components, but it has taken at least 1 to 6 months before normal operation has resumed. However, by adding phytic acid or phytate salts according to the process of the present invention, the efficiency of biodegradation could be restored to normal levels in a very short time. Furthermore, the drop in the efficiency of biodegradation could be prevented by continuing the addition of phytic acid or phytate salts for an extended period.

EXAMPLE 3

Coke-plant waste liquors were treated with two equal sized experimental activated sludge treatment apparatuses under the same conditions as in Example 1 until bulking occurred. Instead of rice bran, sodium phytate was added to the aeration tank daily in an amount of 20 to 50 g per cubic meter of the tank. Seven to ten days later, the activated sludge began to settle, and by continuing the addition of sodium phytate for 20 to 30 consecutive days, the sludge recovered completly from bulking, as indicated by the SVI value of 50 to 70, which was between 200 and 300 before the addition of sodium phytate.

Conventionally, the bulking of activated sludge used to treat coke-plant waste liquors has been remedied by restarting the treatment under the proper conditions after removing the cause of the undesired phenomenon, but it has taken at least 1 to 6 months before the sludge has become readily settleable. It was therefore confirmed that phytate salts were capable of not only increasing the degradability by the activated sludge of pollutants in coke-plant waste liquors but also improving the settleability of the sludge.

EXAMPLE 4

Coke-plant waste liquors were treated with two equal sized experimental activated sludge treatment apparatuses under the same conditions as in Example 1 until bulking occurred and the efficiency of biodegradation of pollutants, especially thiocyanates, was decreased. Instead of rice bran, wheat bran was added to the aeration tank for 5 consecutive days in a daily amount of 50 to 100 g per cubic meter of the tank. Conventionally, it has taken at least 1 to 6 months to recover normal biodegradation. But according to the present invention, the sludge became readily settleable about 10 to 15 days after the addition of wheat bran, and in about 20 to 30 days, the sludge completely recovered from bulking. The biodegradability of the thiocyanates began to improve about 5 to 10 days after the addition of wheat bran, and 10 to 20 days later, normal levels of their biodegradability were restored completely.

Thereafter, 30–50 g/m³ of wheat bran was daily added to the aeration tank for 6 months. As in Example 2 which used phytic acid, the oxygen consumption rate and growth rate of the activated sludge, as well as the quality of the effluent were maintained at high levels, and no drop in the efficiency of biodegradation occurred at any time.

EXAMPLE 5

Coke-plant waste liquors were treated with two equal sized experimental activated sludge treatment apparatuses under the same conditions as in Example 1 until the degradation of thiocyanates slowed down. Then, instead of rice bran, oil cakes left after the extraction of sesame oil were added to the aeration tank daily in an amount of about 50 to 100 g per cubic meter of the tank. About 7 to 10 days later, the degradability of the thiocyanates began to increase, and 10 to 20 days later, their degradability was almost equal to normal levels. In the absence of the oil cakes, it took at least about 20 to 60 days for the degradability of the thiocyanates to return to normal levels.

It was therefore confirmed that oil cakes left after the extraction of sesame oil were also capable of promoting the degradation of thiocyanates.

EXAMPLE 6

Coke-plant waste liquors were treated with two equal sized experimental activated sludge treatment apparatuses under the same conditions as in Example 1 until bulking occurred. Then, instead of rice bran, oil cakes left after the extraction of soybean oil were added daily to the aeration tank in an amount of 50 to 100 g per cubic meter of the tank. Upon addition of the oil cakes, the ORP in the aeration tank dropped from +430 mV to +300 mV, but by increasing the aeration volume, it was increased to a level between +380 and +430 mV. Conventionally, it has taken at least 1 to 6 months for the activated sludge to recover from bulking, but according to the present invention, the activated sludge became easily settleable after continuous application of the oil cakes for about 15 to 20 consecutive days, and about 25 to 30 days later, the sludge completely recovered from bulking.

In the absence of the oil cakes, it took as many as about 2 to 3 months to cure the bulking.

EXAMPLE 7

Coke-plant waste liquors were subjected to a conventional process of ammonia stripping to remove at least 85 to 90% of free ammoniates, as well as the greater part of deleterious components such as volatile sulfides and cyanides. The liquors were then diluted with 4 times their own volume of a mixture of seawater and fresh water. They were supplied as influent liquors to the activated sludge treatment plant, which were operated at a COD volume loading of 1.5 kg/m² day, with the ORP in the aeration tank (capacity: 3,300 m³) of each apparatus being controlled at +430±10 mV. To the aeration tank, about 100 kg of rice bran was added every day. Throughout the treatment, the ORP in the settling tank was held at between about +220 and 270 mV. Phosphoric acid was added to the influent liquor as another phosphorus-containing compound.

The relationship between the concentration of phosphoric acid (as phosphorus) added to the influent liquor and the phosphorus content of the effluent is shown in Table 2.

TABLE 2

| P content of the influent (ppm) | 20 | 16 | 10 | 5 | 4 | 3 |
|---|---|---|---|---|---|---|
| P content of the effluent (ppm) | 15 | 12 | 5 | 3 | 0.9 | 0.5 |
| Effective availability of P (%) | 25 | 25 | 50 | 40 | 78 | 83 |

The data shows that in order to reduce the phosphorus content of the effluent, rice bran must be added to the aeration tank in a daily amount of about 30 ppm and phosphoric acid must be added to the influent liquor in an amount of 3 to 4 ppm (as phosphorus). The results of an activated sludge treatment conducted under these conditions for a period of at least about 3 months are shown in Table 3.

TABLE 3

| | COD (ppm) | thiocyanates (SCN) (ppm) | phenols (ppm) | cyanides (—CN) (ppm) |
|---|---|---|---|---|
| Influent | 2000~2200 | 100~150 | 600~700 | 20~30 |
| Effluent | 60~80 | <1 | <0.5 | <0.2 |
| Percent removal | 96.7 | >99 | about 100 | about 100 |

The conventional activated sludge treatment was effected in the absence of rice bran while about 20 ppm (as phosphorus) of phosphoric acid was added to the influent (COD=2,000—2,200 ppm). The effluent had a phosphorus content between 13 and 17 ppm. Therefore, it was confirmed that according to the present invention, the concentration of phosphorus-containing compounds in the effluent could be held at less than 1 mg/1,000 ml (as phosphorus) while the supply of an inorganic phosphoric acid as a typical example of an additional phosphorus-containing compound was greatly reduced.

EXAMPLE 8

Coke-plant waste liquors having the composition indicated in Example 1 were treated by the activated sludge treatment under the conditions used in Example 7 except that 3 g/m³ of phytic acid and 3 g/m³ of phosphoric acid were added to the influent. The phosphorus content of the effluent was held at between 0.3 and 0.8 mg/m³ and the effluent had a COD of 60-80 ppm which indicated a COD removal of at least 95%. Therefore, a consistent and efficient treatment of the coke-plant waste liquors could be accomplished by the present invention.

What is claimed is:

1. A process for preventing occurrence of a decrease in the efficiency of biodegradation in activated sludge treatment of wastewaters generated in a process for production of coke, wherein said activated sludge treatment utilizes an aeration tank and a sludge settling tank, which process comprises controlling the oxidation-reduction potential in said aeration tank at a level between +400 and +480 mV versus normal hydrogen electrode;

controlling the oxidation-reduction potential in said sludge settling tank at a level not less than +100 mV versus normal hydrogen electrode;

adding (1) at least one member selected from the group consisting of phytic acid, phytate salts and materials containing the same, in an amount of 1 to 100 g per cubic meter of the aeration tank per day for the phytic acid or phytate salts, or in an amount of 10 to 500 g per cubic meter of the aeration tank per day for the materials containing the same, and (2) at least one other phosphorous-containing compound to said aeration tank so that the concentration of the phosphorus-containing compound present in effluent from the activated sludge treatment plant is not more than 1 mg/1,000 ml as phosphorus; and when said oxidation-reduction potential in said aeration tank is reduced by said addition of said member, increasing the reduced oxidation-reduction potential to a level not less than a value between +350 and +430 mV versus normal hydrogen electrode, by means of increasing aeration volume.

2. A process according to claim 1, wherein said materials containing phytic acid or phytate salts are at least one member selected from the group consisting of rice bran, wheat bran, corn husk and an oil cake left after extraction of vegetable oil.

3. A process according to claim 2, wherein said vegetable oil is sesame oil or soybean oil.

4. A process according to claim 2, wherein at least one of said materials containing phytic acid or phytate salts is added to said aeration tank in an amount of 10 to 50 g per cubic meter of said aeration tank per day.

5. A process according to claim 2, wherein rice bran is added to said aeration tank in an amount of 10 to 50 g per cubic meter of said aeration tank per day.

6. A process according to claim 1, wherein at least one of said phytic acid and phytate salts is added to said aeration tank in an amount of 1 to 10 g per cubic meter of said aeration tank per day.

7. A process according to claim 1, wherein at least one of said materials containing phytic acid or phytate salts is added to said aeration tank in an amount of 10 to 50 g per cubic meter of said aeration tank per day.

8. A process according to claim 1, wherein rice bran is added to said aeration tank in an amount of 10 to 50 g per cubic meter of said aeration tank per day.

9. A process for restoring to normal level any decreased efficiency of biodegradation in activated sludge treatment of wastewaters generated in a process for production of coke, wherein said activated sludge treatment utilizes an aeration tank and a sludge settling tank, which process comprises controlling the oxidation-reduction potential in said aeration tank at a level between +400 and +480 mV versus normal hydrogen electrode;

controlling the oxidation-reduction potential in said sludge settling tank at a level not less than +100 mV versus normal hydrogen electrode;

adding (1) at least one member selected from the group consisting of phytic acid, phytate salts and materials containing the same, and (2) at least one other phosphorous-containing compound to said aeration tank so that the concentration of the phosphorus-containing compound present in effluent from the activated sludge treatment plant is not more than 1 mg/1,000 ml as phosphorus; and when said oxidation-reduction potential in said aeration tank is reduced by said addition of said member, increasing the reduced oxidation-reduction potential to a level not less than a value between +350 and +430 mV versus normal hydrogen electrode, by means of increasing aeration volume, and adding, when said decrease in the efficiency of biodegradation occurs in said aeration tank, at least one member selected from the group consisting of phytic acid and phytate salts to said aeration tank in an amount of 20 to 100 g per cubic meter of said aeration tank per day until the oxidation-reduction potential in said aeration tank is increased to a level not less than a value between +350 and +430 mV versus normal hydrogen electrode.

10. A process for restoring to normal level any decreased efficiency of biodegradation in activated sludge treatment of wastewaters generated in a process for production of coke, wherein said activated sludge treatment utilizes an aeration tank and a sludge settling tank, which process comprises controlling the oxidation-reduction potential in said aeration tank at a level between +400 and +480 mV versus normal hydrogen electrode;

controlling the oxidation-reduction potential in said sludge settling tank at a level not less than +100 mV versus normal hydrogen electrode;

adding (1) at least one member selected from the group consisting of phytic acid, phytate salts and materials containing the same, and (2) at least one other phosphorous-containing compound to said aeration tank so that the concentration of the phosphorus-containing compound present in effluent from the activated sludge treatment plant is not more than 1 mg/1,000 ml as phosphorus; and when said oxidation-reduction potential in said aeration tank is reduced by said addition of said member, increasing the reduced oxidation-reduction potential to a level not less than a value between +350 and +430 mV versus normal hydrogen electrode, by means of increasing aeration volume, and adding, when said decrease in the efficiency of biodegration occurs in said aeration tank, at least one member selected from the group consisting of rice bran, wheat bran, corn husk and an oil cake left after extraction of vegetable oil to said aeration tank in an amount of 100 to 500 g per cubic meter of said aeration tank per day until the oxidation-reduction potential in said aeration tank is increased to a level not less than a value between +350 and +430 mV versus normal hydrogen electrode.

11. A process according to claim 10, wherein said vegetable oil is sesame oil or soybean oil.

12. A process for restoring to normal level any decreased efficiency of biodegradation in activated sludge treatment of wastewaters generated in a process for production of coke, wherein said activated sludge treatment utilizes an aeration tank and a sludge settling tank, which process comprises controlling the oxidation-reduction potential in said aeration tank at a level between +400 and +480 mV versus normal hydrogen electrode;

controlling the oxidation-reduction potential in said sludge settling tank at a level not less than +100 mV versus normal hydrogen electrode;

adding (1) at least one member selected from the group consisting of phytic acid, phytate salts and materials containing the same, and (2) at least one other phosphorous-containing compound to said aeration tank so that the concentration of the phosphorus-containing compound present in effluent from the activated sludge treatment plant is not more than 1 mg/1,000 ml as phosphorus; and when said oxidation-reduction potential in said aeration tank is reduced by said addition of said member, increasing the reduced oxidation-reduction potential to a level not less than a value between +350 and +430 mV versus normal hydrogen electrode, by means of increasing aeration volume, and adding, when said decrease in the efficiency of biodegradation occurs in said aeration tank, rice bran to said aeration tank in an amount of 100 to 500 g per cubic meter of said aeration tank per day until the oxidation-reduction potential in said aeration tank is increased to a level not less than a value between +350 and +430 mV versus normal hydrogen electrode.

* * * * *